US010764718B1

(12) United States Patent
Boettcher et al.

(10) Patent No.: US 10,764,718 B1
(45) Date of Patent: Sep. 1, 2020

(54) SYSTEM AND METHOD FOR OBTAINING RADIO FREQUENCY (RF) SIGNAL DATA

(71) Applicant: ANRITSU COMPANY, Morgan Hill, CA (US)

(72) Inventors: Jeff Boettcher, Aubrey, TX (US); Randy Lundquist, Shelley, ID (US); Mark Heimbach, Sunnyvale, CA (US); Daniel R. Harkins, Tulalip, WA (US)

(73) Assignee: ANRITSU COMPANY, Morgan Hill, CA (US)

( * ) Notice: Subject to any disclaimer, the term of this patent is extended or adjusted under 35 U.S.C. 154(b) by 0 days.

(21) Appl. No.: 16/138,869

(22) Filed: Sep. 21, 2018

Related U.S. Application Data

(60) Provisional application No. 62/566,215, filed on Sep. 29, 2017.

(51) Int. Cl.
| | | |
|---|---|---|
| *H04W 24/00* | (2009.01) | |
| *H04W 4/029* | (2018.01) | |
| *G01S 19/13* | (2010.01) | |
| *H04W 4/024* | (2018.01) | |
| *H04B 1/715* | (2011.01) | |
| *H04B 1/7156* | (2011.01) | |

(52) U.S. Cl.
CPC ............ *H04W 4/029* (2018.02); *G01S 19/13* (2013.01); *H04B 1/715* (2013.01); *H04B 1/7156* (2013.01); *H04W 4/024* (2018.02); *H04B 2001/71563* (2013.01); *H04B 2201/698* (2013.01)

(58) Field of Classification Search
CPC .... H04W 4/029; H04W 4/024; H04B 1/7156; H04B 1/715; H04B 2001/71563; H04B 2201/698; G01S 19/13
USPC .............................. 455/456.1–456.3; 370/338
See application file for complete search history.

(56) References Cited

U.S. PATENT DOCUMENTS

| | | | |
|---|---|---|---|
| 5,801,525 | A | 9/1998 | Oldfield |
| 5,812,039 | A | 9/1998 | Oldfield |
| 5,909,192 | A | 6/1999 | Finch |
| 5,977,779 | A | 11/1999 | Bradley |
| 6,049,212 | A | 4/2000 | Oldfield |
| 6,291,984 | B1 | 9/2001 | Wong |
| 6,316,945 | B1 | 11/2001 | Kapetanic |
| 6,331,769 | B1 | 12/2001 | Wong |
| 6,496,353 | B1 | 12/2002 | Chio |
| 6,504,449 | B2 | 1/2003 | Constantine |
| 6,509,821 | B2 | 1/2003 | Oldfield |
| 6,525,631 | B1 | 2/2003 | Oldfield |
| 6,529,844 | B1 | 3/2003 | Kapetanic |
| 6,548,999 | B2 | 4/2003 | Wong |
| 6,650,123 | B2 | 11/2003 | Martens |
| 6,665,628 | B2 | 12/2003 | Martens |
| 6,670,796 | B2 | 12/2003 | Mori |
| 6,680,679 | B2 | 1/2004 | Stickle |

(Continued)

*Primary Examiner* — Marcos Batista
(74) *Attorney, Agent, or Firm* — Tucker Ellis LLP

(57) ABSTRACT

A system includes a plurality of mobile monitor setups, each mobile monitor setup connected with a vehicle. Each mobile monitor setup includes an omnidirectional antenna, a global positioning system (GPS) signal antenna configured to receive GPS signals and a receiver configured to obtain a plurality of radio frequency (RF) measurements. The plurality of RF measurements are swept across one or more frequency bands and each RF measurement is time stamped and location stamped based on received GPS signals.

20 Claims, 5 Drawing Sheets

(56) References Cited

U.S. PATENT DOCUMENTS

| | | |
|---|---|---|
| 6,700,366 B2 | 3/2004 | Truesdale |
| 6,700,531 B2 | 3/2004 | Abou-Jaoude |
| 6,714,898 B1 | 3/2004 | Kapetanic |
| 6,766,262 B2 | 7/2004 | Martens |
| 6,832,170 B2 | 12/2004 | Martens |
| 6,839,030 B2 | 1/2005 | Noujeim |
| 6,882,160 B2 | 4/2005 | Martens |
| 6,888,342 B2 | 5/2005 | Bradley |
| 6,894,581 B2 | 5/2005 | Noujeim |
| 6,917,892 B2 | 7/2005 | Bradley |
| 6,928,373 B2 | 8/2005 | Martens |
| 6,943,563 B2 | 9/2005 | Martens |
| 7,002,517 B2 | 2/2006 | Noujeim |
| 7,011,529 B2 | 3/2006 | Oldfield |
| 7,016,024 B2 | 3/2006 | Bridge |
| 7,019,510 B1 | 3/2006 | Bradley |
| 7,054,776 B2 | 5/2006 | Bradley |
| 7,068,046 B2 | 6/2006 | Martens |
| 7,088,111 B2 | 8/2006 | Noujeim |
| 7,108,527 B2 | 9/2006 | Oldfield |
| 7,126,347 B1 | 10/2006 | Bradley |
| 7,284,141 B2 | 10/2007 | Stickle |
| 7,304,469 B1 | 12/2007 | Bradley |
| 7,307,493 B2 | 12/2007 | Feldman |
| 7,509,107 B2 | 3/2009 | Bradley |
| 7,511,577 B2 | 3/2009 | Bradley |
| 7,521,939 B2 | 4/2009 | Bradley |
| 7,545,151 B2 | 6/2009 | Martens |
| 7,683,602 B2 | 3/2010 | Bradley |
| 7,683,633 B2 | 3/2010 | Noujeim |
| 7,705,582 B2 | 4/2010 | Noujeim |
| 7,746,052 B2 | 6/2010 | Noujeim |
| 7,764,141 B2 | 7/2010 | Noujeim |
| 7,872,467 B2 | 1/2011 | Bradley |
| 7,924,024 B2 | 4/2011 | Martens |
| 7,957,462 B2 | 6/2011 | Aboujaoude |
| 7,983,668 B2 | 7/2011 | Tiernan |
| 8,027,390 B2 | 9/2011 | Noujeim |
| 8,058,880 B2 | 11/2011 | Bradley |
| 8,145,166 B2 | 3/2012 | Barber |
| 8,156,167 B2 | 4/2012 | Bradley |
| 8,159,208 B2 | 4/2012 | Brown |
| 8,169,993 B2 | 5/2012 | Huang |
| 8,185,078 B2 | 5/2012 | Martens |
| 8,278,944 B1 | 10/2012 | Noujeim |
| 8,294,469 B2 | 10/2012 | Bradley |
| 8,305,115 B2 | 11/2012 | Bradley |
| 8,306,134 B2 | 11/2012 | Martens |
| 8,410,786 B1 | 4/2013 | Bradley |
| 8,417,189 B2 | 4/2013 | Noujeim |
| 8,457,187 B1 | 6/2013 | Aboujaoude |
| 8,493,111 B1 | 7/2013 | Bradley |
| 8,498,582 B1 | 7/2013 | Bradley |
| 8,593,158 B1 | 11/2013 | Bradley |
| 8,629,671 B1 | 1/2014 | Bradley |
| 8,630,591 B1 | 1/2014 | Martens |
| 8,666,322 B1 | 3/2014 | Bradley |
| 8,718,586 B2 | 5/2014 | Martens |
| 8,760,148 B1 | 6/2014 | Bradley |
| 8,816,672 B1 | 8/2014 | Bradley |
| 8,816,673 B1 | 8/2014 | Barber |
| 8,884,664 B1 | 11/2014 | Bradley |
| 8,903,149 B1 | 12/2014 | Noujeim |
| 8,903,324 B1 | 12/2014 | Bradley |
| 8,942,109 B2 | 1/2015 | Dorenbosch |
| 9,103,856 B2 | 8/2015 | Brown |
| 9,103,873 B1 | 8/2015 | Martens |
| 9,176,174 B1 | 11/2015 | Bradley |
| 9,176,180 B1 | 11/2015 | Bradley |
| 9,210,598 B1 | 12/2015 | Bradley |
| 9,239,371 B1 | 1/2016 | Bradley |
| 9,287,604 B1 | 3/2016 | Noujeim |
| 9,331,633 B1 | 5/2016 | Robertson |
| 9,366,707 B1 | 6/2016 | Bradley |
| 9,455,792 B1 | 9/2016 | Truesdale |
| 9,560,537 B1 | 1/2017 | Lundquist |
| 9,571,142 B2 | 2/2017 | Huang |
| 9,588,212 B1 | 3/2017 | Bradley |
| 9,594,370 B1 | 3/2017 | Bradley |
| 9,606,212 B1 | 3/2017 | Martens |
| 9,696,403 B1 | 7/2017 | Elder-Groebe |
| 9,733,289 B1 | 8/2017 | Bradley |
| 9,753,071 B1 | 9/2017 | Martens |
| 9,768,892 B1 | 9/2017 | Bradley |
| 9,860,054 B1 | 1/2018 | Bradley |
| 9,964,585 B1 | 5/2018 | Bradley |
| 9,967,085 B1 | 5/2018 | Bradley |
| 9,977,068 B1 | 5/2018 | Bradley |
| 10,003,453 B1 | 6/2018 | Bradley |
| 10,006,952 B1 | 6/2018 | Bradley |
| 10,064,317 B1 | 8/2018 | Bradley |
| 10,116,432 B1 | 10/2018 | Bradley |
| 2006/0250135 A1 | 11/2006 | Buchwald |
| 2008/0146161 A1* | 6/2008 | Bugenhagen ......... H04W 16/18 455/67.11 |
| 2011/0037667 A1 | 2/2011 | Varjonen |
| 2012/0002704 A1* | 1/2012 | Husted ................. H04L 1/0001 375/136 |
| 2014/0269842 A1* | 9/2014 | Lacatus ............... H04B 1/7156 375/134 |
| 2016/0050032 A1 | 2/2016 | Emerson |
| 2016/0095012 A1* | 3/2016 | Laukkanen ............ H04L 5/006 370/252 |
| 2016/0227432 A1* | 8/2016 | Freeman ........... H04W 28/0289 |

* cited by examiner

SYSTEM AND METHOD FOR OBTAINING RADIO FREQUENCY (RF) SIGNAL DATA

CLAIM OF PRIORITY

This application claims the benefit of priority to U.S. Provisional Application titled "SYSTEM AND METHOD FOR OBTAINING RADIO FREQUENCY (RF) SIGNAL DATA", Application No. 62/566,215, filed Sep. 29, 2017, which application is herein incorporated by reference.

TECHNICAL FIELD

The present invention relates to receiving, storing and analyzing ambient radio frequency (RF) signal data.

BACKGROUND

Interference in telecommunication networks is becoming more and more problematic as demand for wireless services continues to grow and allocated frequency bands become compressed. Interference can result in noisy links in analog transmissions, and limited range, dropped calls, or low data rates for digital transmissions. Once an interfering signal is detected, the interfering signal can be characterized to possibly identify the source of the interfering signal.

Sources of interference can be internal to a telecommunication network or can be external to the telecommunication network. External sources of interference can include not only signal transmitters, but also sources of impulse noise created whenever a flow of electricity is abruptly started or stopped. Many external, interfering signals cannot be identified using typical techniques and the source of the signal must be located by hunting for the source. However, the variety of different possible sources of interference and the ability of some sources to interfere from great distances can make locating the source difficult. Identifying a source of interference therefore requires collecting data from various geographic locations, which can be time consuming.

In addition to interference, operators of telecommunication networks and/or wireless carriers can benefit generally from understanding their network performance, including understanding network coverage, signal strength within network, locations of dead spots, variation in coverage and network performance with time of day, variation in coverage and network performance with changing weather conditions, etc.

Still further, operators of telecommunication networks and/or wireless carriers can benefit from understanding the signal profiles within their frequency bands of interest within their operating area and/or outside of their operating area, as well as other frequency bands. For example, a wireless carrier may look to license frequency bands that are not occupied to expand its services.

SUMMARY

In accordance with an embodiment, a system includes a plurality of mobile monitor setups, each mobile monitor setup connected with a vehicle. Each mobile monitor setup includes an omnidirectional antenna, a global positioning system (GPS) signal antenna configured to receive GPS signals and a receiver configured to obtain a plurality of radio frequency (RF) measurements. The plurality of RF measurements are swept across one or more frequency bands and each RF measurement is time stamped and location stamped based on received GPS signals. Each monitor setup can be configured to obtain RF measurements when a vehicle to which that monitor setup is operational.

In accordance with an embodiment, the system further includes a central data storage. Each mobile monitor setup is configured to upload data related to the plurality of RF measurements obtained by that mobile monitor setup to the central data storage. Each monitor setup can be configured to upload the data via a cellular network.

In accordance with an embodiment, the system further includes a plurality of stationary monitor setups. Each stationary monitor setup connected with a stationary location and includes an omnidirectional antenna and a receiver configured to obtain a plurality of radio frequency (RF) measurements. The plurality of RF measurements are swept across one or more frequency bands and each RF measurement is time stamped and location stamped based on the station location.

In accordance with an embodiment, each stationary monitor setup is configured to upload data related to the plurality of measurements obtained by that stationary monitor setup to the central data storage.

In accordance with an embodiment, the received data related to the plurality of RF measurements obtained by the plurality of mobile monitor setups and the stationary monitor setups (where used) can be analyzed to generate, from the data, a characterization of electromagnetic signals in space and time across an area traversed by the vehicles. Alternatively and additionally, the data can be used to identify, based on the characterization, interference sources negatively affecting a frequency band from the one or more frequency bands and/or a frequency band from the one or more frequency bands free of signals.

DETAILED DESCRIPTION

Figure 1:
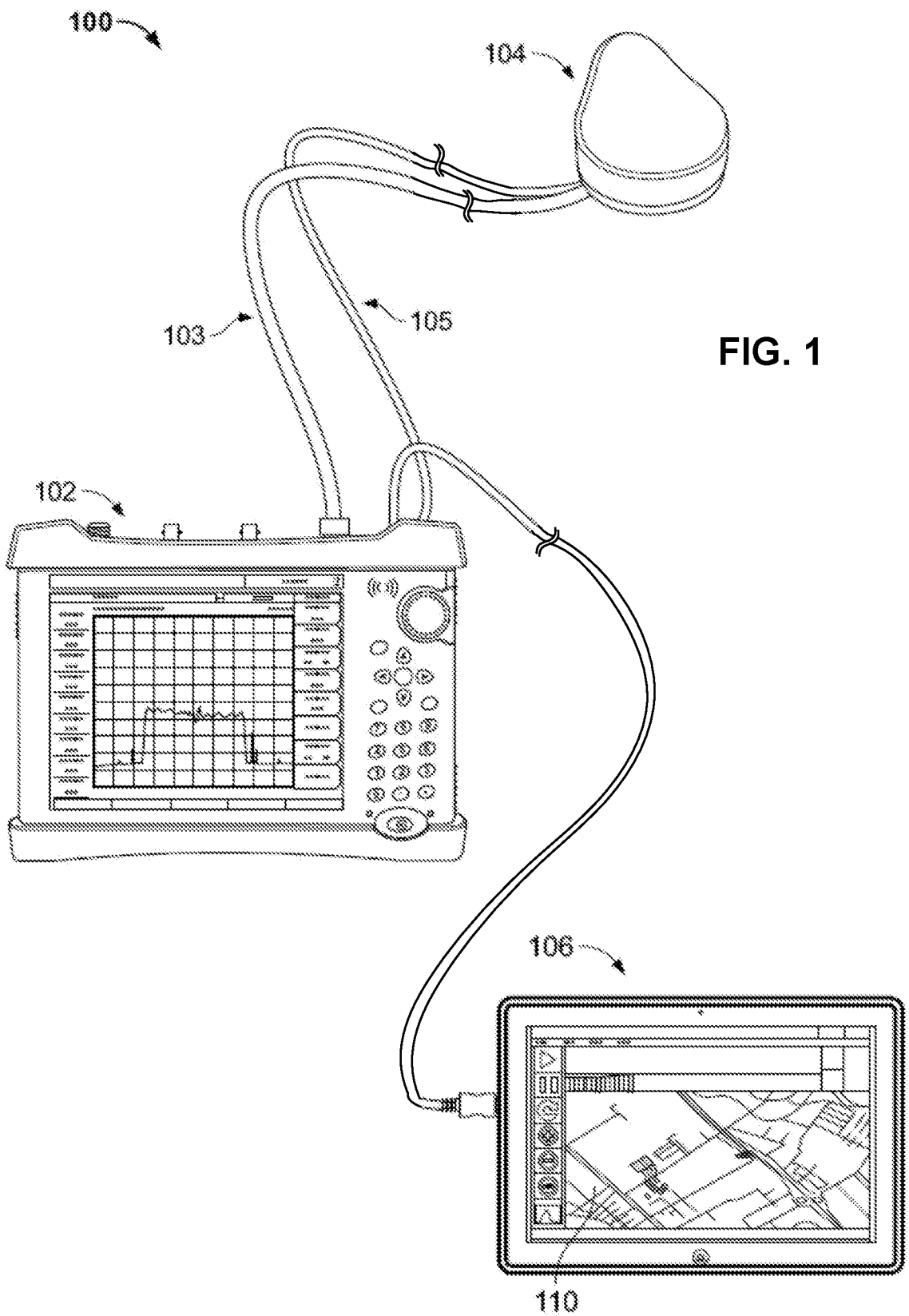
FIG. 1 illustrates a system for receiving RF signals.

The following description is of the best modes presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout.

It would be apparent to one of skill in the art that the present invention, as described below, may be implemented in many different embodiments of hardware, software, firmware, and/or the entities illustrated in the figures. Any actual software, firmware and/or hardware described herein is not limiting of the present invention. Thus, the operation and behavior of the present invention will be described with the understanding that modifications and variations of the embodiments are possible, given the level of detail presented herein.

External sources of interference capable of unacceptably affecting a telecommunication network can be difficult to locate, due to the myriad different types of sources capable of emitting interference and the fact that interference can be created at great distances. In order to more quickly locate a source, it is preferable to approximate a likely location of the source to narrow the geographic range of the location, and to follow this approximation with a search on foot to finally identify the location and nature of the source.

Currently, available techniques for approximating a likely location of a source of interference rely on the use of a direction finding (DF) antenna consisting of an array of antenna elements. One technique uses measurement of the phase angles between a reference antenna element and the other elements of the DF antenna to determine a direction from which an interfering signal is received. A correlative interferometer, for example, compares the measured phase differences with the phase differences obtained for a DF antenna system of known configuration at a known wave angle (i.e., a reference data set). The comparison is made for different azimuth values of the reference data set and the bearing is obtained from the data for which the correlation coefficient is at a maximum. Some techniques further locate the source of the interfering signal by means of a running fix, taking bearings at multiple locations and calculating the location of the source from the results using triangulation.

A DF antenna used for approximating a likely location of a source of interference can be quite large. For example, a nine element DF antenna usable to detect an LTE signal with a downlink band centered at about 880 MHz can be larger than three feet in diameter. Further, DF antennas typically operate in limited frequency bands, and due to their limited applicability, can be orders of magnitude more costly relative to omnidirectional antennas, which are widely used for a variety of applications, generally inexpensive, and usable over a wide range of frequencies.

Currently available solutions that improve upon the use of DF antennas to hunt down interference signals include those described in U.S. Pat. No. 9,560,537 entitled "SYSTEMS AND METHODS FOR DETERMINING A LOCATION OF A SIGNAL EMITTER BASED ON SIGNAL POWER" issued to Lundquist, et al., which is incorporated herein by reference.

FIG. 1 illustrates a test setup for measuring an interference signal. The test setup is usable by a user, such as a field engineer and/or technician, to measure characteristics of an interference signal from an interference signal source at different geographic locations. Wireless carriers, regulatory agencies and broadcast and satellite operators, among others, can benefit from the ability to locate an interference signal source using measurements at different geographic locations to improve performance and/or reduce customer downtime. The test setup comprises an omnidirectional antenna and a global positioning system (GPS) antenna arranged proximate to the omnidirectional antenna. As shown, both antennas are housed as a single unit 104, although the antennas can be separately housed. Further, as shown the single unit 104 includes a magnetized base, allowing the single unit 104 to be mounted and held fixed on a metal roof of a vehicle, for example. By mounting to a vehicle, the test setup can quickly measure target signals received by the omnidirectional antenna over a large geographical area.

The test setup further comprises a spectrum analyzer 102. The omnidirectional antenna can be connected with the spectrum analyzer at a radio frequency (RF) IN port of the spectrum analyzer via a first cable 103, while the GPS antenna can be connected with the spectrum analyzer at a GPS port of the spectrum analyzer via a second cable 105. In an embodiment, the omnidirectional antenna is usable across a wide frequency range of the spectrum analyzer. In an embodiment, the omnidirectional antenna is usable over substantially the entire frequency range of the spectrum analyzer, thereby permitting use of a single omnidirectional antenna for any frequency allocated in the range of the spectrum analyzer (e.g., 9 kHz to 43 GHz for the MS2720T SPECTRUM MASTER® available from ANRITSU™).

The spectrum analyzer can further connected with a computing device 106 on which a software system for locating the interference signal source is installed. The test setup is adapted to operate/process according received signal. As shown, the computing device is a tablet computer connected with the spectrum analyzer via a USB cable; however, the computing device can be any other device capable of executing the software system and communicating instructions to a use. For example, the computing device can be a laptop computer, mobile phone, or a computer integrated into a vehicle. Further, the GPS signal can be obtained from some other source, for example a commercially available navigation system, which when received by the computing device or the spectrum analyzer, can be synchronized and combined with RF power measurements to determine a location of the measurements.

The test setup need not transmit signals, but rather receives signals, measuring power in those signals falling within a target frequency or band of frequencies. The software system can use channel power measurements to enable locating a variety of signal types, from wideband modulated signals to narrowband or continuous wave (CW) signals. The channel power bandwidth is configurable as appropriate for the target interference signal source. The signal can also be configured to track signals having a frequency that drifts over time.

As will be appreciated, an interference signal source will commonly emit at a frequency or in a frequency band that is actively being used by a telecommunication network to transmit signals. For example, an interference signal source may be emitting a signal hidden in an LTE uplink band that is actively being used by the telecommunication network. The location software can use a "min hold" algorithm to capture the interfering signal while eliminating the LTE traffic signal from measurement consideration. For example, a transmission can include a 20 MHz band that will periodically be dead. The min hold algorithm is an algorithm that identifies the interference signal source at the minimum received power. The received signal from the telecommunications network will drop to baseline over the course of a few seconds, allowing the interference signal to be identified. Further, in an embodiment, the location software is usable to locate pulsed signals via a "max hold" algorithm that captures intermittent signals only when transmitting, thereby avoiding erroneously measuring a pulsed signal when the pulsed signal is not active.

While the test setup as described above has been disclosed in U.S. Pat. No. 9,560,537 to capture power measurements of signals within a frequency band and direct a user according to an algorithm to surround an interference source and direct the user via directions to locate the interference source, such a test setup can also be used as a monitor setup for embodiments of systems and methods in accordance with the present invention that are not necessarily used to process and apply measurement data in real-time to locate interference sources by providing driving directions to a user interacting with the monitor setup.

In accordance with an embodiment, a system and method can comprise collecting RF signal data using a monitor setup mounted on or in one or more vehicles for analysis. The data can be used, if desired, for real time analysis, but can also be analyzed at a later time. The monitor setup as described above can be included in one or more vehicles that are driven around an environment, collected RF signal data in one or more frequency bands.

In accordance with an embodiment, the system and method can include a monitor setup mounted in a plurality of vehicles that can be driven for the purpose of collecting data. For example, the monitor setups can be mounted on service vans operated by a technician on behalf of a telecommunication network operator or wireless carrier (e.g., Verizon, AT&T).

In accordance with an embodiment, the system and method can include a monitor setup mounted in a plurality of vehicles that are driven for any purpose, related or unrelated to the collection of RF data within the ambient environment in which it is driven. For example, the system can include a monitor setup mounted in each vehicle driven on behalf of a taxi cab company and/or an online transportation company, such as an app-based peer-to-peer ridesharing, food delivery, bicycle-sharing, or other transportation network company (e.g., Lyft, Uber, GrubHub etc.). For example, a monitor setup can include a remote spectrum monitoring device placed or mounted under a seat of the vehicle.

Alternatively, or additionally, the system can further include monitor setups mounted on vehicles for shipping companies (e.g., UPS, FedEx, DHL, etc.). Alternatively, or additionally, the system can include a monitor setup mounted on each bus of a fleet of buses operated by a city (e.g., the San Francisco Municipal Transportation Agency). Still further, such monitor setups can be mounted on intercity bus common carriers and/or trains, such as CalTrain, and/or mounted in the cab of a semi-trailer truck, for example, enabling the sampling of RF signals along travel and shipping corridors between cities. Monitor setups can even be mounted or otherwise arranged in unconventional or uncommon vehicles such as snowmobiles, drones and watercraft. Monitor setups can even be equipped in a backpack, although such use cases may include RF data collection that is more purposeful than incidental.

In accordance with an embodiment, RF data collected via the individual monitor setups can be aggregated and analyzed, for example, by an operator of a telecom network, a wire carrier, or alternatively by a third party that can make available, upon request and/or for a fee, the RF data and/or a specific requested analysis of the RF data (e.g., network coverage and receive powers in a geographic area). As an example, a company that manufactures remote spectrum monitoring equipment, such as the above describe spectrum analyzer of the monitor setup, may lease or sell the equipment to a third party data aggregator, or may itself operate as a data aggregator.

In accordance with an embodiment, a system and method can include partnering with one or more operators of the above identified entities (i.e., taxi cab companies, online transportation companies, municipal transportation agencies, etc.) to collect the data. For example, a licensing agreement between a data aggregator and a partner may include a blanket licensing payment, i.e., a license for a partner's fleet, or payment of a license for each vehicle in which remote spectrum monitoring equipment is mounted, or payment of a fee for the data that is actually collected by the partner.

In addition to the above, a data aggregator could, for example, partner with insurance carriers to subsidize insurance for customers that allow remote spectrum monitoring equipment to be carried or mounted in their vehicles.

In accordance with an embodiment, RF data received and collected by monitor setups that are arranged in fixed locations, e.g., mounted in stationary positions, such as on telephone poles or towers, can also be aggregated and used with RF data collected from vehicles.

In accordance with an embodiment, a data aggregator can obtain data for any of the above potential sources of RF data alone or in combination with other sources of RF data and can purchase the data using any of the above licensing strategies (or other licensing strategies) on a source by source basis if desired.

In accordance with an embodiment, RF data collected via the individual monitor setups can be aggregated and analyzed to characterize one or more frequency bands across a geographic area and over a range of operating hours, potentially 24 hours and 365 days a year along certain routes and corridors.

Figure 2A:
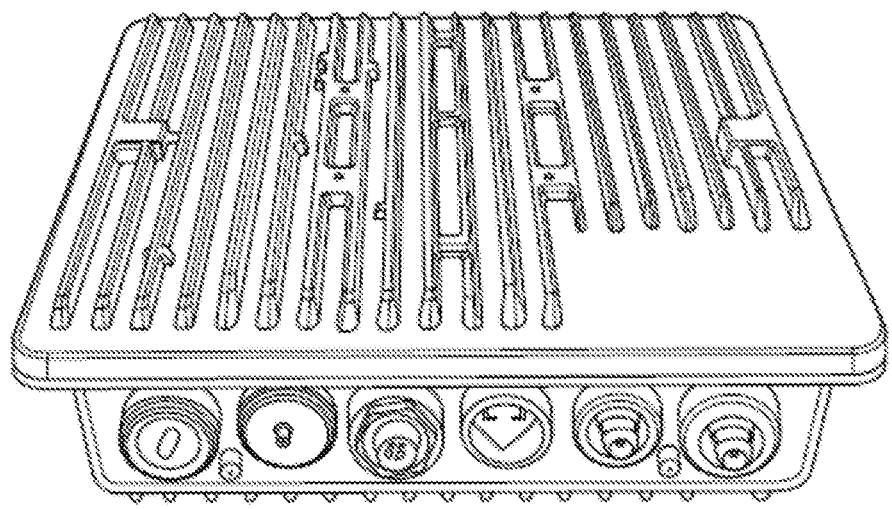
FIGS. 2A-2C illustrates a remote spectrum monitor usable with systems and methods to receive and collect RF signals, in accordance with an embodiment.
Figure 2B:
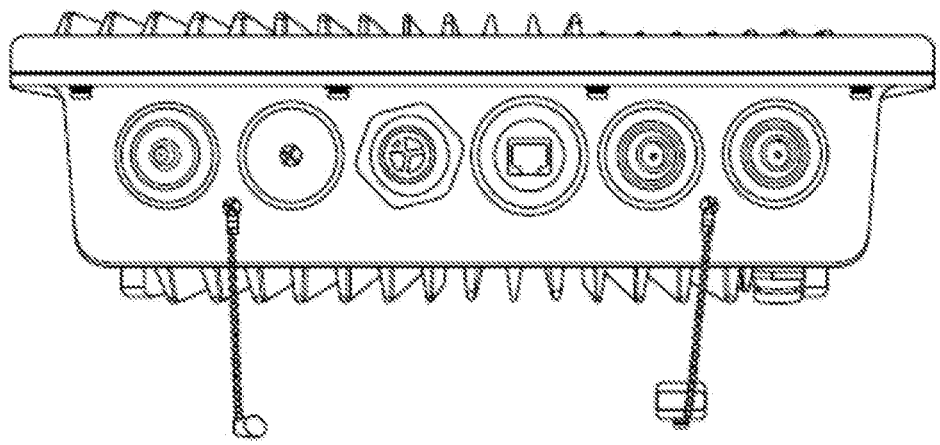
Figure 2C:
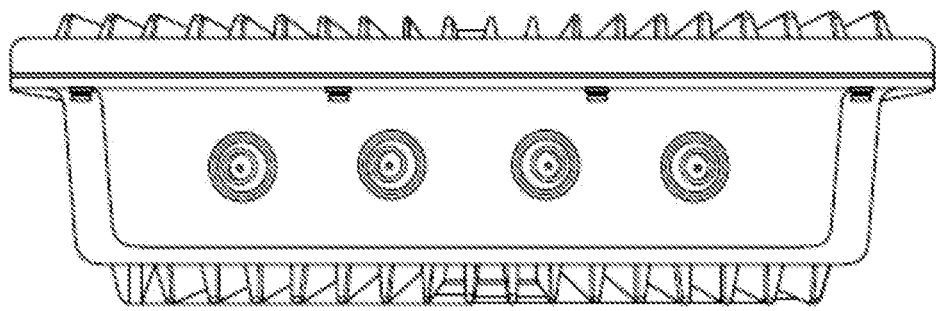

FIGS. 2A-2C illustrates a remote spectrum monitor comprising a receiver usable with another monitor setup for use with system and embodiments in accordance with the present invention. The monitor setup includes a remote spectrum monitor, for example a model MS27102A remote spectrum monitor available from ANRITSU®, that need not be connected with a laptop or screen, and which is rugged and water-proof, allowing it to be used in various environments for long periods of service, with a unit not likely to fail in the field. The remote spectrum monitor can receive and collect RF signal data for later analysis while a vehicle in (or on) which it is mounted moves about the city. As illustrated, the remote spectrum monitor includes a GPS receiver and an input for connecting a GPS antenna, such as the GPS antenna included in the housing of the omnidirectional antenna described above with regard to FIG. 1. The remote spectrum monitor also includes inputs for RF connectable with the omnidirectional antenna to receive RF signals received at the omnidirectional antenna. As above, the omnidirectional antenna can be removably mounted on the hood of a vehicle. Alternatively, the omnidirectional antenna can be mounted so that the omnidirectional antenna is semi-permanently arranged (i.e., not typically removed from an initial setup for long periods) in or on a vehicle. For example, an antenna can be permanently mounted to the roof of a bus.

The MS27102A remote spectrum monitor, for example, includes an integrated web server. Using an internet browser, a user can log in to the spectrum monitor from anywhere to control the remote spectrum monitor. This includes accessing such parameters as frequency settings, resolution and video bandwidth (RBWNBW) control, reference level configuration and other settings relevant to spectrum monitoring. Trace data, spectrograms and other measurements can be viewed inside the browser window. Any electronic device capable of rendering a browser can access the web server. As illustrated, the MS27102A remote spectrum monitor includes a Gbit Ethernet port through which measurement data and control information can be transferred, and the monitor setup can include a separate transceiver for transmitting the data received via the Ethernet port to a cell tower for aggregation of the data in central storage.

In accordance with embodiment, data upload can be achieved using any known interface for transferring data available to a remote spectrum monitor. For example, data upload can be achieved via a cellular USB modem inserted into the spectrum monitor or inserted into a router connected to the spectrum monitor. Data can also be recorded locally, either inside the remote spectrum monitor memory or on a USB memory stick or USB hard disk attached to the remote spectrum monitor. Data can then be uploaded later to a server via WiFi, Ethernet or (again) via wireless USB modem, if desired.

In still other embodiments, a monitor setup usable with system and methods can include some other remote spectrum monitor or spectrum analyzer, or other measuring instrument capable of receiving and collecting RF signal measurement data, including for example any remote spectrum monitor in the MS2710xA family available from ANRITSU®. Different remote spectrum monitors can have different operating frequencies. For example, the MS27102A is listed as having an operating range of 9 kHz-6 GHz, however, it may be desirable to include in a monitor setup a remote spectrum monitor having a higher operating range, such as the MS2760A which has an operating frequency in the millimeter wave range, specifically with an upper range of 110 GHz. Embodiments of methods in accordance with the present invention are not intended to be limited in frequency range, but are usable within any frequency range capable of being measured by the receiver(s) or monitor(s) used.

In accordance with embodiment, a method can include placing spectrum monitors in and/or on one or more mobile vehicles and/or stationary objects to collect spectrum measurements. The technique of collecting data from spectrum monitors both stationary and moving within a geographical area, but without necessarily giving moving vehicles directions for where or how to move within the geographical area is referred to herein as "swarming".

Figure 3:
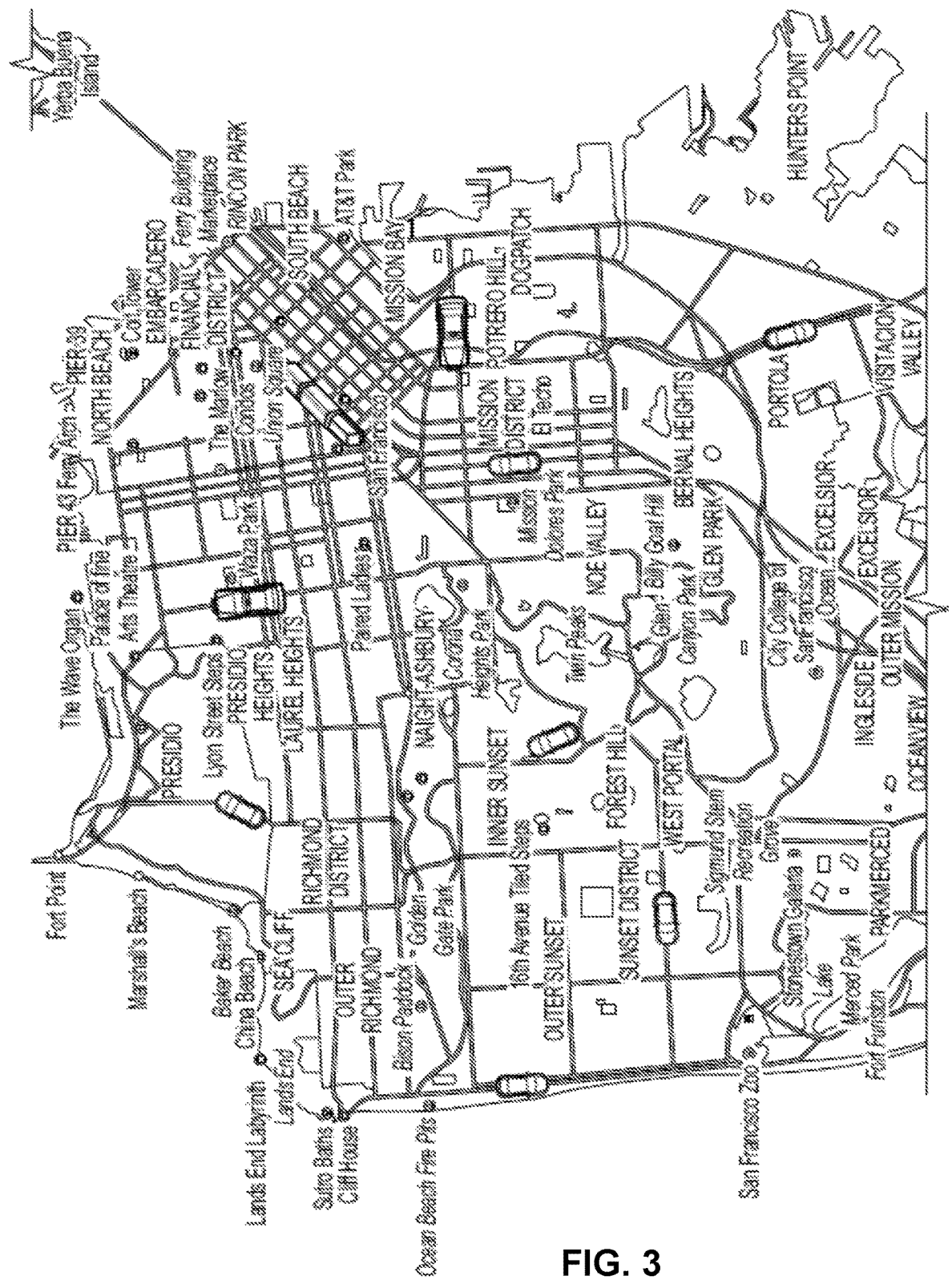
FIG. 3 illustrates an exemplary deployment of remote spectrum monitors in moving vehicles in a geographic area, in accordance with an embodiment.

FIG. 3 illustrates an example of swarming using vehicles including automobiles, delivery vans and a municipal light rail train within each of which is placed a spectrum monitor traversing a geographic area to receive RF data wherever that vehicle is located. The purpose is to collect spectrum measurements across a wide geographic area. Measurements can be utilized for various purposes, as described below. Additionally, the reach and capabilities of spectrum monitors can be extended using spectrum monitors located in stationary (non-mobile) locations. The vehicles are constantly moving about the geographic area at different times of day, and in different parts of the geographic area, with the data being pushed up to a cloud server, for example.

Data collected can be analyzed to detect and locate interference, provide spectrum occupancy information, explore white space opportunities, examine areas where dynamic frequency allocation can take place, provide coverage mapping information, etc. Additionally, interference signals can be found and located that are measured in close proximity to a moving vehicle or other source of RF data. Techniques such as angle of arrival (AoA), power on arrival (POA) and time difference of arrival (TDOA) measurements can be used to enhance accuracy in geo-locating signals of interest.

In accordance with an embodiment, the method can include autonomous data collection by the spectrum monitor. The driver of a vehicle, for example, need not interact with the spectrum monitor while the spectrum monitor is collecting data. The driver need not even be aware of data collection. Further, in accordance with an embodiment, the driver need not interact with the spectrum monitor to transfer the collected data from the spectrum monitor. For example, the spectrum monitor can be connected with a cell site, either by an internal transceiver of the spectrum monitor or an external transceiver connected with the spectrum monitor. The spectrum monitor can be connected via the cell site to a data center to which the spectrum monitor uploads the collected data. Alternatively, in other embodiments, the collected data can be periodically downloaded to physical media, for example a FLASH memory drive, for transfer to a central database. However, this may require interaction either by a driver if the vehicle is a private vehicle, or by some other individual responsible for collecting data, which can be unreliable and possibly untimely.

In accordance with an embodiment, the spectrum monitor can be set up such that the spectrum monitor must be turned on by a driver of a vehicle before performing measurements. Alternatively, the spectrum monitor can be powered by the vehicle such that the remote monitor is powered off if the vehicle is not running, and is powered on when the vehicle is running. Alternatively, the spectrum monitor may be automatically turned on via detection by a motion sensor, or by some other means such that the driver of the vehicle need not necessarily interact with the spectrum monitor for the spectrum monitor to being collecting RF data.

In accordance with an embodiment, one or more analytical techniques can be applied to the aggregated data to mine the data. The techniques can be used, for example, for such purposes as interference mitigation, coverage mapping, spectrum occupancy, dynamic frequency allocation analysis, competitive analysis (measure signal quality, data rates, etc), signal encroachment, homeland security applications, border protection, and tracking and identifying drone activity.

In accordance with an embodiment, certain of the analytical technics can use aggregated data selected to provide results for a triangle of three probes to geo-locate a signal of interest. For example, of twenty or thirty service vehicles driving randomly in the city collecting data, triangles are formed that enable geo-location for identifying sources of interference. Each of the spectrum monitors, when receiving RF signals and making measurements, also receive GPS signals. The RF signal measurements are coupled to the GPS signals to identify the location of the measurement, and are further time-stamped so that signals used for triangulation can be matched in time and selected in space to more accurately perform the triangulation.

In accordance with embodiments, systems and methods can include aggregated RF data and providing the RF data or an analysis of the RF data to many other customers including but not necessarily limited to cellular service provider(s). Any type of signal, even legitimate signals operating in licensed (or unlicensed) bands can be an interferer. For example, legitimate signals can have too much power generated or antennas can be pointed incorrectly.

Data collection can be performed both as the vehicle is in motion or stationary. In accordance with an embodiment, in most cases, the data collection is done via a scanning function. A number of different frequency bands are quickly scanned and recorded. A vehicle in motion can scan multiple frequency bands. How fast the scanner scans each frequency band is a function of multiple parameters such as RBWNBW setting, number of frequency points captured, etc. For example, a receiver of the spectrum monitor with certain settings may be capable of sweeping at least five frequency bands every second. As described above, each measurement is time stamped and location stamped.

RF data collected on the monitor can be stored locally and pushed in intervals to a central repository, either a cloud based platform or standalone server. The data can also be pulled from a cloud based platform or standalone server. Deep Learning techniques can be used in the cloud or standalone server to successfully identify signal sources by type, i.e. jammers, leakage, Internet of Things (IoT) and Narrowband (NB)-IoT devices, etc., that are either intentional or unintentional in nature. These profiles can be shared with individual monitors to improve the local determination of signal sources and to enable a network wide neural network focused on RF signal sources. This will have the ability to identify both desired and undesired signal sources.

Examples include Downlink interference by analyzing the side lobes of a captured signal within a certain band and comparing results of the analysis to the desired or past know signals. GPS and frequency band can also be used by the neural network to better identify other areas where the signal has occurred. This type of multilayer analysis can be used to generate heat maps of probable locations and sources. Thus, enabling an individual/human (e.g., a technician) to understand what type of physical signal source is suspect.

Automated interference hunting can also be implemented by overlaying a calculated heat map based on multiple monitor data sources along with a GPS vectored map. Utilizing this type of data and applying a grid driving technique to guide an individual/human to the potential signal source is possible, as described above in U.S. Pat. No. 9,560,537, for example.

Some potential customers, such as a wireless carrier operating in a certain frequency band, may only be interested in data for that specific frequency band, or multiple bands but not all of the frequencies 9 kHz to 20 GHz, for example. One exemplary use case could include, for example, a technician for a wireless carrier arriving for a shift and finding out that there were coverage problems the night before. Rather than climbing into vans to gather data to track down a source of interference, the technicians may have access to the data needed collected the night before. The technicians may be able to use the data to triangulate the source of the interference.

As discussed above, other applications for using the collected data that a customer such as a wireless carrier may be interested in knowing includes looking for dead spots in their coverage, or looking for places where someone else is leaking signals, or knowing how good the network is, and where the network operator needs to put up another tower, or whether the network operator needs to tweak the angle of an antenna or something. If all of the data is aggregated there are many opportunities to develop applications that mine the aggregated data to produce different types of reports.

Figure 4:
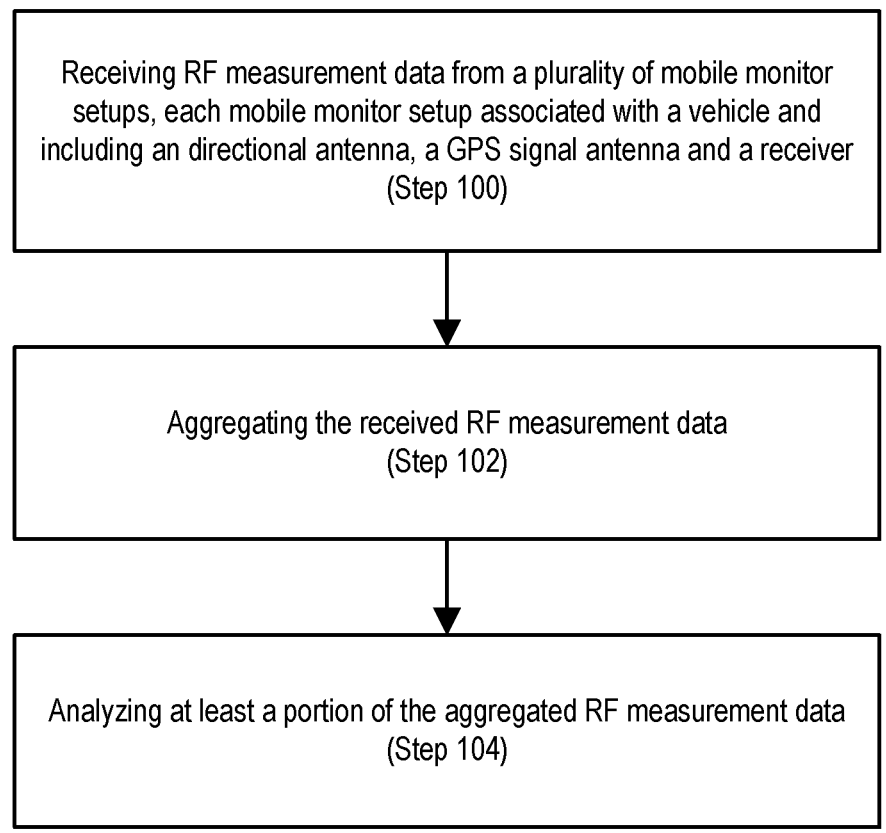
FIG. 4 is a flowchart of a method of providing RF data analysis, in accordance with an embodiment.

FIG. 4 is a flowchart for a method of providing RF data analysis, in accordance with an embodiment. The method includes receiving RF measurement data from a plurality of mobile monitor setups, each mobile monitor setup associated with a vehicle and including an directional antenna, a GPS signal antenna and a receiver (Step 100), aggregating the received RF measurement data (Step 102), and analyzing at least a portion of the aggregated RF measurement data (Step 104). Each monitor setup can be configured to obtain RF measurement when a vehicle with which that monitor setup is associated is operation. Optionally, the analysis of the aggregated RF measurement data and/or a portion of the aggregated RF measurement data can be provided to a customer upon request.

In an embodiment, a method can further comprise providing a central data storage and uploading, via each mobile monitor setup, data related to the plurality of RF measurements obtained by that mobile monitor setup to the central data storage. For example, each monitor setup can be configured to upload the data via a cellular network. The RF measurement data is time and location stamped, and can be periodically uploaded to a central storage device, such as a cloud server.

In an embodiment, a method further comprises receiving RF measurement data from a plurality of stationary monitor setups, each stationary monitor setup connected with a stationary location and including an omnidirectional antenna and a receiver. The plurality of RF measurements are swept across one or more frequency bands and each RF measurement is time stamped and location stamped based on the station location. The received RF measurement data is aggregated from the plurality of stationary monitor setups with the RF measurement data from the plurality of mobile monitor setups. At least a portion of the aggregated RF measurement data is then analyzed.

Where the system includes a central data storage, each stationary monitor setup can be configured to upload data related to the plurality of measurements obtained by that stationary monitor setup to the central data storage. As with the mobile monitor setup, RF measurement data from stationary setups is time and location stamped, and can be periodically uploaded to a central storage device, such as a cloud server.

Systems and Methods for Identifying Signal Sources

In some use case scenarios, RF data such as those measurements collected and aggregated via swarming, as described above, can be used to identify RF sources. For example, in neighborhoods that have had cable for a long time, a site or five or six in the same vicinity, for example, can start leaking, causing interference. When interference is detected, a technician will often hunt for a single source where there are multiple sources and the technician may consequently have difficulty identifying the source. This can be very confusing because the interference signal can have a broad spread and result from different sources. But if vehicles are driving the roads and generating data, embodiments of the present invention can apply algorithms to identify multiple locations within the neighborhood, and the frequency at which interference is occurring, and a technician can use this data to identify the source.

Another use case can include identifying area where nothing is happening to identify where a potential customer may want to use a bandwidth. Thus, data can be used for searching for potential client space rather than for rogue signals. A signal-free space can be valuable. Embodiments in accordance with the present invention can provide meaningful techniques to observe and/or characterize the electromagnetic spectrum to identify where there is not only no signal, but where there is never a signal, or where there is no signal between certain hours, i.e., where there is not full enough coverage, etc. By identifying signal-free space, a client (or a service providing data via swarming) can then identify who owns that license, and then where desired attempt to acquire the signal-free space.

Another use can include characterizing signals in a public space. There may be bands where C.B. radio, walkie-talkies and other devices used by individuals are broad casting. By characterizing the space, the data analysis can understand what is going on in that space and determining whether the space is full or whether the space is useful, and/or identifying what the space can be used for.

One example of a use case includes dynamic frequency allocation. If an underutilized spectrum can be identified, it can be repurposed by multiplexing signals. Signals can "share" a spectrum between different applications. For example, the military may perform various electronic experiments at sea off the coast, but that same spectrum may also be used for commercial broadcast. An established hierarchy can prioritize military use, so that when the military needs the spectrum it is assigned to the military, and all other licensees are taken offline. Such a use case can assign users to tiers. In this example, the military is a first tier user. A second tier may occupy the spectrum 90% of the time for use in commercial broadcasting. A third tier may occupy the spectrum when broadcast is not using it (e.g., after broadcast hours). The same band can be allocated to different users based on prioritization.

In accordance with an embodiment, systems and methods can apply signal identification (ID) algorithms to identify signals. Such methods can include very fast analysis to identify signals in the air to assist in hunting signals and identifying the source and type of the signal. Such systems and methods can be applied, for example, by regulators who want to know if a signal space is being violated, and identifying who the violator is. Signal space violation may not necessarily be intentional. Signal space violation can result from design flaws or errors, or a tilted antenna that results in interference.

By applying systems and methods in accordance with the present invention, an interfering signal can be identified along with the source of the interfering signal. In many circumstances, identifying the source of an interfering signal can allow the interference to be quickly resolved, for example by contacting a party responsible for the source. This can save money and time, reducing the need to hunt for interference sources.

In accordance with an embodiment, systems and methods apply a signal ID algorithm that analyzes what the signal looks like, i.e. the shape on a spectrum analyzer, and compares that shape with stored patterns to identify a match or something close to a match. By knowing what a signal is, often times the source can be identified.

Another use case includes identifying a drone. Drones have become common place. Often drones are flown in places where they are not permitted, such as near airports or across international borders, performing surveillance or other tasks such as recreational photography/videography. Drones are controlled by radio controllers operating in the 2.4 to 2.48 GHz spectrum. Drones can operate, for example, by frequency hopping across eighty different bands at 1 MHz spacing. A certain frequency controls each of the four motors for instance, and those four will all power on and will hop to different frequencies very quickly, choosing one set of frequencies, and then choosing another set of frequencies, and then choosing another set of frequencies among the eighty different bands, using five or six at a time. The bands are not necessarily together, but are spread out. Each radio control manufacturer uses a different algorithm in terms of how those signals hop and what the patterns are.

Saving a pattern and associating that pattern with a particular drone allowing that drone to be identified when that pattern is later matched to another signal source. The patterns can be identified and stored by sampling the behavior of multiple different devices, for example by buying a drone and observing the way its control signals behave or by observing a known drone in flight and capturing and storing its control patterns. When another drone enters a space, it can quickly be identified, in a matter of tens of seconds, by observing the spectrum for the communication between that drone and the associated radio controller. In accordance with an embodiment, systems and methods can map out a signal pattern and determine at least who the manufacturer of the drone is as well as, for example, the model of the drone, and potentially recognize, for example, that a drone is from a hostile source, for instance (i.e., a drone from North Korea crossing the DMZ).

Signals need not necessarily be demodulated to obtain certain values such as pilot code, etc. In accordance with embodiment, this type of signal quality analysis is part of swarming. The resulting analysis can be useful to cellular operators in determining signal quality (for example) in various coverage areas. The recorded signal hopping patterns common with drone signals can be saved in a server for future reference.

Figure 5:
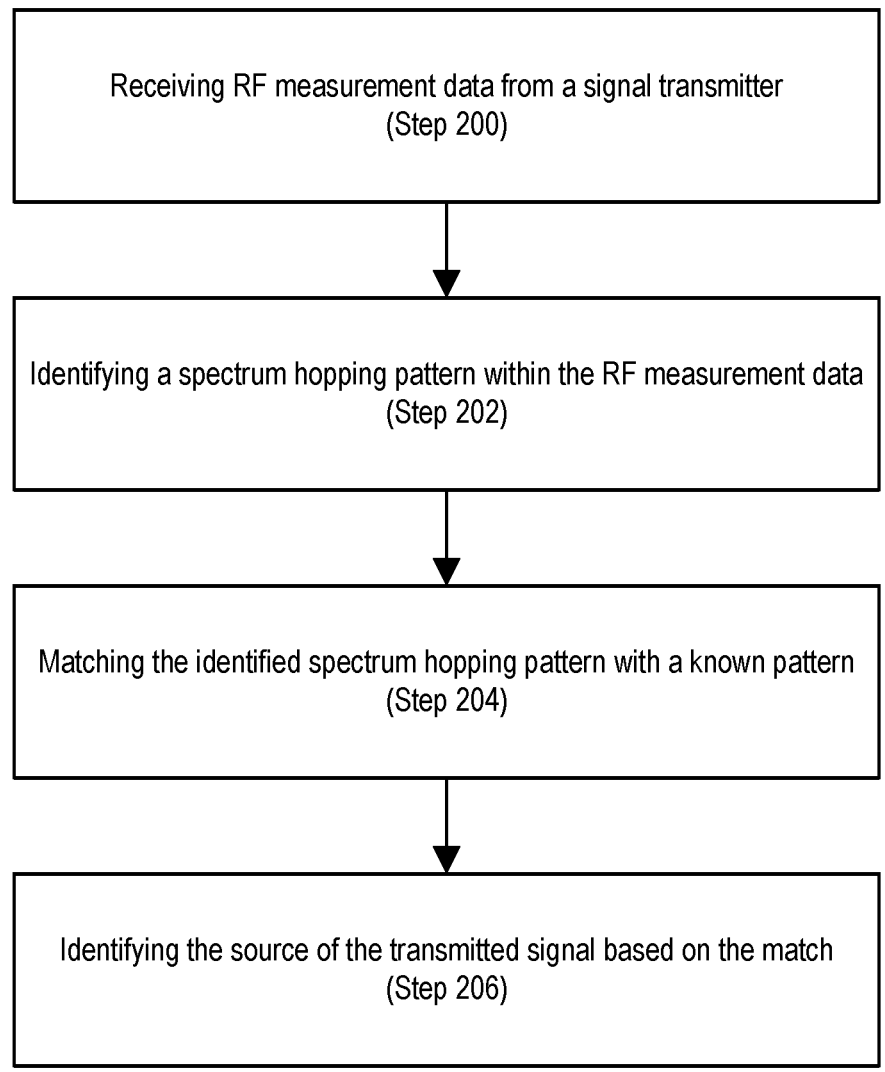
FIG. 5 is a flowchart for a method of identifying a signal source, in accordance with an embodiment.

FIG. 5 is a flowchart for a method of identifying a signal source, in accordance with an embodiment. The method includes receiving RF measurement data from a signal transmitter (Step 200), identifying a spectrum hopping pattern within the RF measurement data (Step 202), matching the identified spectrum hopping pattern with a known pattern (Step 204), and identifying the source of the signal transmitter based on the match (Step 206).

Identifying Signal Sources in Real Time

In accordance with still other embodiments, systems and methods can be applied using data as described herein in real time. For example, distance can be determined via receipt of multiple signals and alignment of those signals to determine distance to an object. A signal generated at a location will take longer to reach one location than another at a greater distance. This lag will be very small, e.g., it might take a nanosecond later getting to one probe then another probe. In accordance with an embodiment, a location of an object can be determined very precisely in some cases, by collecting RF data at three different places. The signals are then time aligned based on distinctive features of the signal. Based on the arrival time of the signal determined from the alignment, the relative distance can enable the location of the object to be determined.

Such systems and methods can be applied using various data gathering techniques. For example, a system and method can use data collection from two fixed probes and a third probe moving in a vehicle. Alternatively, all three probes could be arranged in moving vehicles. A use case scenario could include three Jeeps driving in a battle area looking for explosive devices signatures. The data could be collected in real time, and POA or TDOA techniques could be applied to identify the location of an explosive device. TDOA in particular can be applied to demodulate the signal and look for information for performing time alignment (and thus distance). These techniques can be applied to swarming.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

The invention claimed is:

1. A system comprising:
   a central system comprising a central data storage and a processor;
   a plurality of vehicle-mounted remote spectrum monitors, each remote spectrum monitor associated with a vehicle of a plurality of vehicles;
   wherein each of the plurality of remote spectrum monitors comprises, an omnidirectional antenna, a global positioning system (GPS) signal antenna configured to receive GPS signals, a receiver configured to obtain a plurality of radio frequency (RF) measurements swept across a plurality of frequency bands, wherein each of the plurality of RF measurements is time stamped and location stamped based on received GPS signals;
   wherein each remote spectrum monitor is configured to upload the plurality of time and location stamped RF measurements to the central system over a cellular network; and
   wherein the central system is configured to aggregate the plurality of time and location stamped RF measurements uploaded by the plurality of remote spectrum monitors, and generate, from the aggregated plurality of time and location stamped RF measurements, a characterization of RF signals in space and time across an area traversed by the plurality of vehicles with which the plurality of remote spectrum monitors are associated.

2. The system of claim 1, wherein the central system is further configured to identify signal source locations based on the characterization of RF signals in space and time across the area traversed by the plurality of vehicles.

3. The system of claim 1, wherein the central system is further configured to perform dynamic frequency allocation based on the characterization of RF signals in space and time across the area traversed by the plurality of vehicles.

4. The system of claim 1, wherein each remote spectrum monitor is configured to obtain the plurality of RF measurements autonomously when a vehicle with which that monitor setup is associated is operational.

5. The system of claim 1, further comprising:
   a plurality of stationary remote spectrum monitors, each stationary remote spectrum monitor connected with a stationary location;
   wherein each stationary remote spectrum monitor comprises, an omnidirectional antenna, a receiver configured to obtain a plurality of radio frequency (RF) measurements, wherein the plurality of RF measurements are swept across one or more frequency bands, and wherein each RF measurement is time stamped and location stamped based on the station location, and uploaded to the central system.

6. The system of claim 5, wherein each stationary remote spectrum monitor is configured to upload data comprising the plurality of time and location stamped RF measurements obtained by that stationary remote spectrum monitor to the central system.

7. The system of claim 1, wherein:
   the central system is further configured to identify interference sources negatively affecting a frequency band from the one or more frequency bands in the area traversed by the plurality of vehicles using the aggregated plurality of time and location stamped RF measurements.

8. The system of claim 7, wherein:
   the central system is further configured to identify, a frequency band from the one or more frequency bands which is free of interference in the area traversed by the plurality of vehicles.

9. A method comprising:
   providing a central system comprising a central data storage and a processor;
   providing a plurality of mobile remote spectrum monitors, each remote spectrum monitor associated with a vehicle of a plurality of vehicles, wherein each remote spectrum monitor comprises, an omnidirectional antenna, a global positioning system (GPS) signal antenna configured to receive GPS signals, and a receiver configured to obtain radio frequency (RF) measurements;
   making a plurality of RF measurements using the receiver of each of the plurality of remote spectrum monitors wherein the plurality of RF measurements are swept across a plurality of frequency bands, and wherein each of the plurality of RF measurements is time stamped and location stamped based on received GPS signals;
   uploading the plurality of time and location stamped RF measurements from the plurality of remote spectrum monitors to the central system using a cellular network;
   receiving, at the central system, the plurality of time and location stamped RF measurements from the plurality of remote spectrum monitors;
   aggregating using the central system, the received plurality of time and location stamped RF measurements from the plurality of remote spectrum monitors; and
   analyzing, using the central system, at least a portion of the aggregated received plurality of time and location stamped RF measurements.

10. The method of claim 9, wherein:
    analyzing at least a portion of the aggregated received plurality of time and location stamped RF measurements comprises generating a characterization of RF signals in space and time across an area traversed by the plurality of vehicles.

11. The method of claim 9, wherein
    analyzing at least a portion of the aggregated received plurality of time and location stamped RF measurements comprises identifying signal source locations based on the characterization of RF signals in space and time across the area traversed by the plurality of vehicles.

12. The method of claim 9, wherein making a plurality of RF measurements is performed autonomously by each of the plurality of remote spectrum monitors when a vehicle with which that remote spectrum monitor is associated is operational.

13. The method of claim 10, further comprising:
receiving radio frequency (RF) measurement data from a plurality of stationary remote spectrum monitors, each stationary remote spectrum monitor connected with a stationary location and including, an omnidirectional antenna, a receiver configured to obtain a plurality of radio frequency (RF) measurements, wherein the plurality of RF measurements are swept across one or more frequency bands, and wherein each RF measurement is time stamped and location stamped based on the station location;
aggregating, with the central system, the received time and location stamped RF measurement from the plurality of stationary remote spectrum monitors with the plurality of time and location stamped RF measurements from the plurality of mobile remote spectrum monitors; and
analyzing, with the central system, at least a portion of the aggregated time and location stamped RF measurements.

14. The method of claim 9, wherein analyzing at least a portion of the aggregated received plurality of time and location stamped RF measurements comprises:
generating a characterization of RF signals in space and time across an area traversed by the plurality of vehicles; and
identifying interference sources negatively affecting a frequency band from the one or more frequency bands in the area traversed by the plurality of vehicles using the characterization of RF signals in space and time across the area traversed by the plurality of vehicles.

15. The method of claim 9, wherein analyzing at least a portion of the aggregated received plurality of time and location stamped RF measurements comprises:
generating a characterization of RF signals in space and time across an area traversed by the plurality of vehicles; and
identifying, a frequency band from the one or more frequency bands which is free of interference.

16. The method of claim 9, wherein analyzing at least a portion of the aggregated received plurality of time and location stamped RF measurements comprises:
generating a characterization of RF signals in space and time across an area traversed by the plurality of vehicles; and
performing dynamic frequency allocation based on the characterization of RF signals in space and time across the area traversed by the plurality of vehicles.

17. The method of claim 9, further comprising:
providing the analysis of the aggregated received plurality of time and location stamped RF measurements to a customer upon request.

18. The method of claim 13, further comprising:
providing a portion of the aggregated received plurality of time and location stamped RF measurements to a customer upon request.

19. A method comprising:
providing a central system comprising a central data storage and a processor;
providing a plurality of mobile remoted spectrum monitors, each remote spectrum monitor mounted in a vehicle of a plurality of vehicles, and each remote spectrum monitor including,
an omnidirectional antenna,
a global positioning system (GPS) signal antenna configured to receive GPS signals,
a receiver configured to obtain radio frequency (RF) measurements autonomously when a vehicle with which said each mobile monitor setup is associated is operational;
making a plurality of RF measurements using the receiver of each of the plurality of remote spectrum monitors, wherein the plurality of RF measurements are swept across a plurality of frequency bands, and wherein each of the plurality of RF measurements is time stamped and location stamped based on received GPS signals;
uploading the plurality of time and location stamped RF measurements from the plurality of remote spectrum monitors to the central system using a cellular network;
aggregating, at the central system, the plurality of time and location stamped RF measurements uploaded from the plurality of remote spectrum monitors; and
generating at the central system, from the aggregated plurality of time and location stamped RF measurements, a characterization of RF signals in space and time across an area traversed by the plurality of vehicles.

20. The method of claim 19, further comprising:
identifying interference sources negatively affecting a frequency band from the one or more frequency bands in the area traversed by the plurality of vehicles using the characterization of RF signals in space and time across the area traversed by the plurality of vehicles.

* * * * *